United States Patent
Roman

[19]

[11] Patent Number: 6,155,296
[45] Date of Patent: Dec. 5, 2000

[54] LINEAR FLUID FLOW VALVE

[75] Inventor: James K. Roman, Rochester Hills, Mich.

[73] Assignee: Eaton Corporation, Cleveland, Ohio

[21] Appl. No.: 09/261,869

[22] Filed: Mar. 3, 1999

[51] Int. Cl.[7] .................................................. F16K 11/052
[52] U.S. Cl. ................... 137/625.29; 237/12.3 B
[58] Field of Search .......................... 137/625.29, 625.4, 137/625.43; 251/305; 237/8 R, 12.3 B

[56] References Cited

U.S. PATENT DOCUMENTS

| | | | |
|---|---|---|---|
| 2,113,775 | 4/1938 | Van Vulpen | 137/625.29 |
| 3,238,969 | 3/1966 | Champion | 137/625.29 |
| 4,361,170 | 11/1982 | Peloza | 137/625.29 |
| 5,255,891 | 10/1993 | Pearson et al. | 251/129.11 |
| 5,374,032 | 12/1994 | Pearson et al. | 251/368 |
| 5,531,248 | 7/1996 | Pearson et al. | 137/625.46 |
| 5,967,185 | 10/1999 | Baruschke et al. | 137/625.29 |

*Primary Examiner*—John Fox
*Attorney, Agent, or Firm*—Roger A. Johnston

[57] ABSTRACT

A bypass configured butterfly type rotary valve particularly suitable for controlling engine coolant flow to a passenger compartment heater core outlet. A baffle is employed to increase linearity of flow control when the butterfly is close to shutting off flow to the heater core outlet. An additional baffle increases linearity as the butterfly nears the fully open position for shutting off flow to the supply return or bypass. In one embodiment of the baffle is formed integrally with the valve body. In another embodiment, the baffle is formed as a flapper mounted on the shaft with the butterfly, but remaining stationary as the butterfly is rotated. The additional baffle is formed as a scalloped thickened edge of the butterfly in one embodiment, or as a separate insert in another embodiment. The baffles increase the linearity of the valve throughout the full range of movement of the butterfly.

15 Claims, 10 Drawing Sheets

LINEAR FLUID FLOW VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to fluid flow control valves and particularly valves of the type controlling flow from a supply or source of pressurized fluid to an auxiliary outlet for connection to a fluid function circuit where a variable portion of the flow may be bypassed to a return passage to the supply. Bypass valves, as they are sometimes referred to, have found particular application in controlling flow of heated engine coolant to an on-board heat exchanger or heater core for temperature control in the passenger compartment of a motor vehicle. Typically, such valves are operated by manual cables, vacuum actuators or electric motor servo actuators. Bypass heater valves for automotive passenger compartment climate control applications have commonly employed a rotating throttle plate or butterfly for simplicity and relatively low manufacturing costs.

However, a simple butterfly-type valve has the characteristic that full flow is achieved when the valve is opened approximately one-fourth of its movement from the closed to the fully open position. Thus, accurate control of the flow requires precise positioning control of the butterfly by the actuating mechanism. This property of the butterfly valve has resulted in problems in maintaining the flow to the heater at the desired level with a servo mechanism in an automatic temperature control system for the passenger compartment.

Furthermore, butterfly-type water valves employed in a bypass valve configuration exhibit the characteristic that at nearly closed rotary positions of the butterfly, flow to the heater core does not occur and even reverse flow has been encountered in the region of the butterfly plate; and, the butterfly has been rendered ineffective in directing flow to the heater core channel. Accordingly, it has been desired to provide a way or means of preventing abnormal flow effects in a butterfly type bypass configured water valve and to improve the linearity of the flow control of the valve over the range of movement of the butterfly plate.

Figure 15:
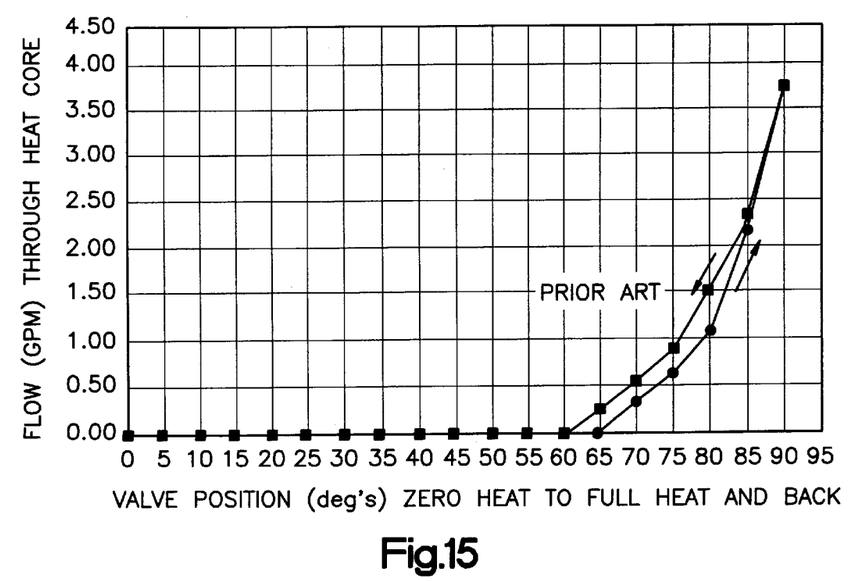

Referring to FIG. 15, a graphical plot of flow through the heater core outlet for an existing prior art by-pass valve versus the rotary position of the butterfly valve, when rotated from the closed position to the full flow position for flow to the heater core outlet; and, for flow upon return to the closed position is illustrated. It will be observed from FIG. 15 that the valves of the prior art produce no flow to the auxiliary or heater core circuit until the valve is opened substantially; and, upon reaching full flow to the heater core outlet there is a significant amount of hysteresis upon closing of the valve.

BRIEF SUMMARY OF THE INVENTION

The present invention provides a butterfly-type valve in a bypass configuration for controlling flow from a supply to an auxiliary outlet passage for connection to a function circuit and for diverting some of the flow to a return to the supply. The valve of the present invention is particularly suited for heater core water valve applications in automotive passenger car climate control systems.

The valve of the present invention utilizes a baffle which, in one embodiment, extends from the intersection of the main valve passage and the auxiliary outlet passage toward the central region of the butterfly valve. In another embodiment the baffle is disposed as a pivoted flapper on the butterfly plate and the flapper moves relative to the butterfly for performing the baffling function. An additional baffle may be added as an insert in the main valving passage adjacent the supply inlet or a thickened baffle formed on the butterfly plate.

The present invention thus provides a simple and low-cost way or means of improving the linearity of the flow characteristics of a butterfly-type heater core water valve for automotive climate control applications in a manner that does not require substantial retooling for manufacture of the valve body.

DETAILED DESCRIPTION OF THE INVENTION

Figure 1:
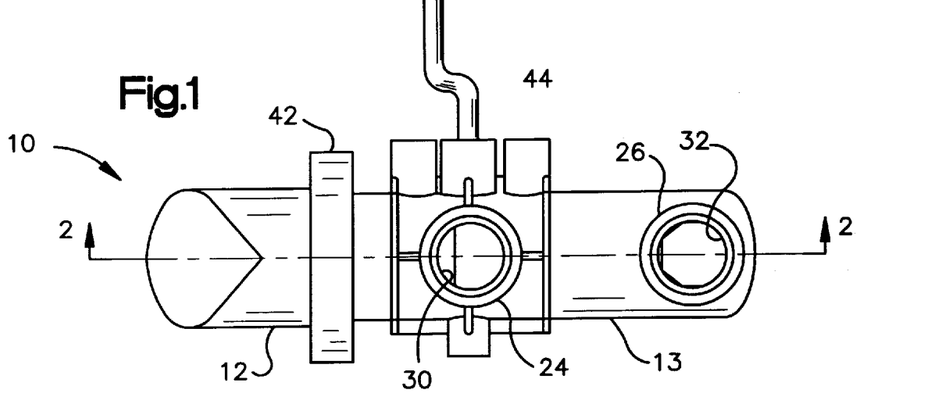
FIG. 1 is a side view of the valve of the present invention.
Figure 2:
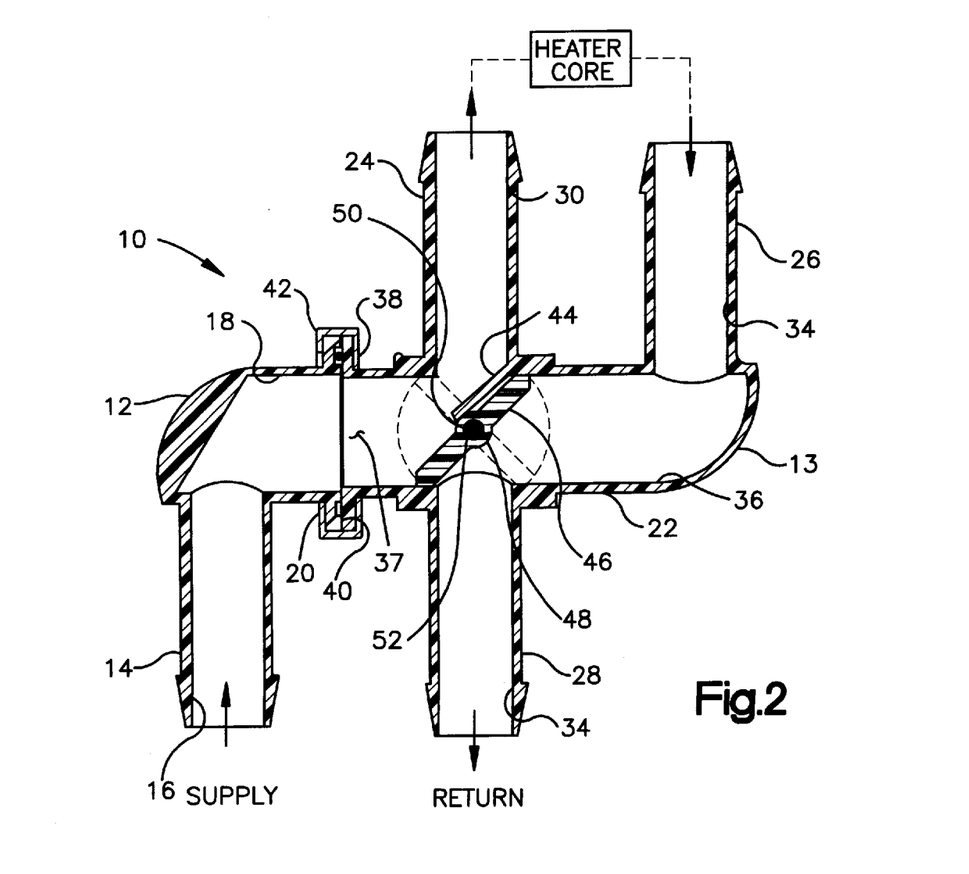
FIG. 2 is a section view taken along section-indicating lines 2—2 of FIG. 1.
Figure 3:
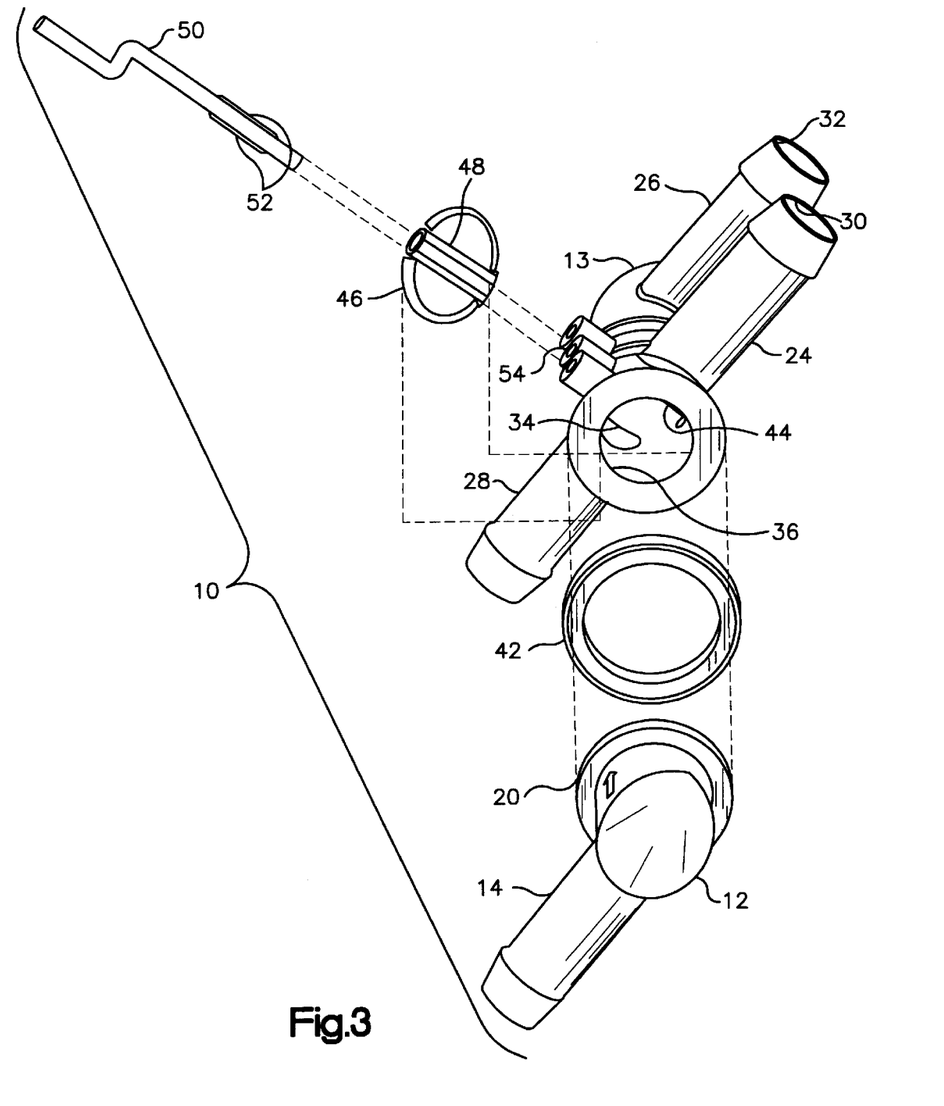
FIG. 3 is an exploded view of the valve assembly of FIG. 1.

Referring to FIGS. 1 through 3, an embodiment of the invention is indicated generally at 10 and includes a valve body formed in two pieces comprising an inlet section 12 having an inlet tube 14 formed thereon which has therein an inlet passage 16 which communicates with the interior hollow 18 which forms a portion of the valving chamber of the member 12. The member 12 has an annular flange 20 formed thereabout at the open end of hollow 18.

The valve 10 of the present invention includes an outlet section 22 for the body, which has formed thereon an auxiliary outlet tube 24 aligned in spaced relationship with an auxiliary inlet tube 26; and, a main return outlet tube 28 is formed thereon coincident with tube 24 and oppositely directed therefrom as shown in FIG. 2. Each of the tubes 24, 26, 28 has an interior passage denoted respectively 30, 32, 34 which communicates with the interior valving passage 36 of the member 13.

The member 13 also has an annular flange 38 formed thereabout at the open end of passage 36 which is sealed against flange 20 of member 12 by a suitable seal ring 40 and secured thereagainst by a clamp band 42 having a generally U-shaped configuration in transverse section. Thus hollow 18 of body member 12 and interior passage 36 of member 13 are thus joined to form valving chamber 37.

A baffle 44 is formed integrally with the intersection of auxiliary outlet passage 30 and the valving chamber wall 36 in member 22 and extends interiorly therefrom at an angle of approximately 45° as illustrated in FIG. 2 toward the center of valving chamber 37.

A butterfly valve plate 46 is disposed in the valving chamber 37 and is preferably formed of thermoplastic elastomer or plasticized plastic material and has a hub portion 48 extending across the center thereof and which has received therein an actuator shaft 50 which has keys 52 formed thereon for engaging correspondingly configured surfaces in the hub 48 to provide driving engagement between shaft 50 and the valve member 46.

It will be understood that the butterfly member is assembled into member 13 prior to attachment to member 12 by clamp band 42; and, the shaft 50 is inserted through a bore 54 provided through body member 13 (see FIG. 3) such that when assembled, the butterfly is rotatable from the position shown in solid outline in FIG. 2 to the position indicated by the dashed lines. It will be understood that the butterfly is illustrated in solid outline in FIG. 2 in the full "OPEN" position, i.e., wherein full flow is diverted to the auxiliary outlet passage 30 and for return through passage 32 to return outlet 34. Baffle 44 functions to direct flow to auxiliary outlet passage 30 when the butterfly member 46 is in a position near or close to the position closing auxiliary outlet passage 30.

Figure 4:
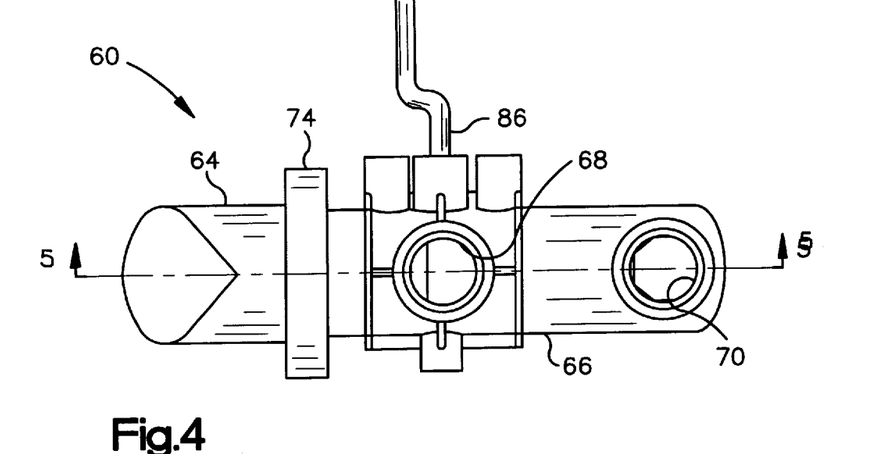
FIG. 4 is a side view of an alternative embodiment of the valve of the present invention.
Figure 5:
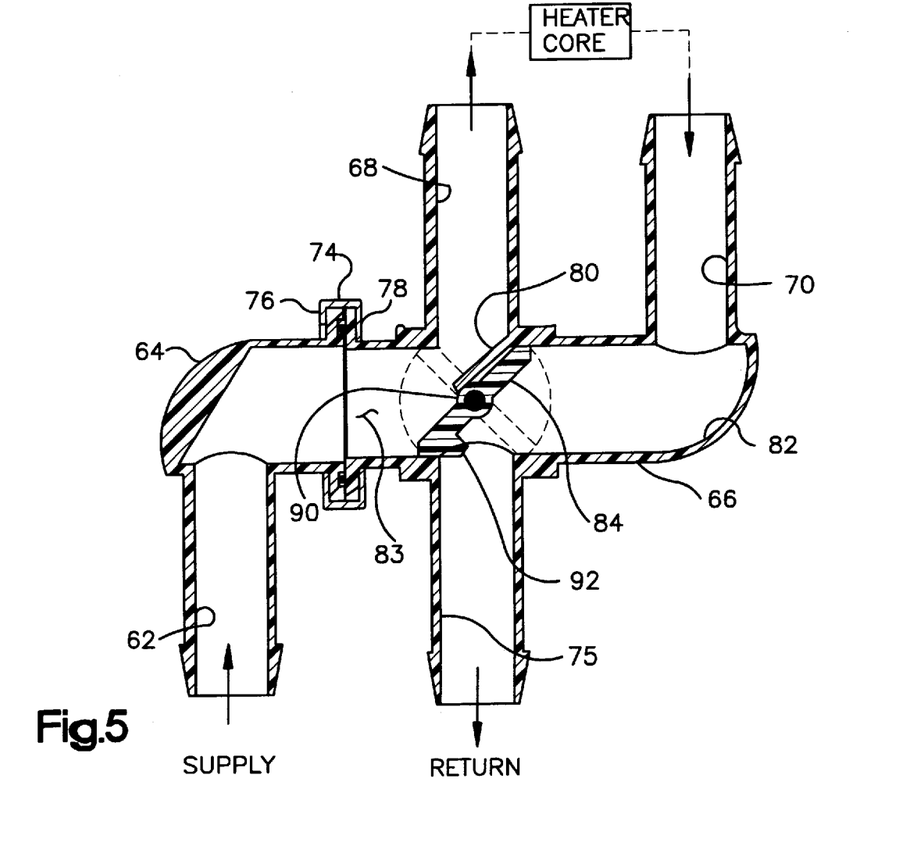
FIG. 5 is a section view taken along section-indicating lines 5—5 of FIG. 4.
Figure 6:
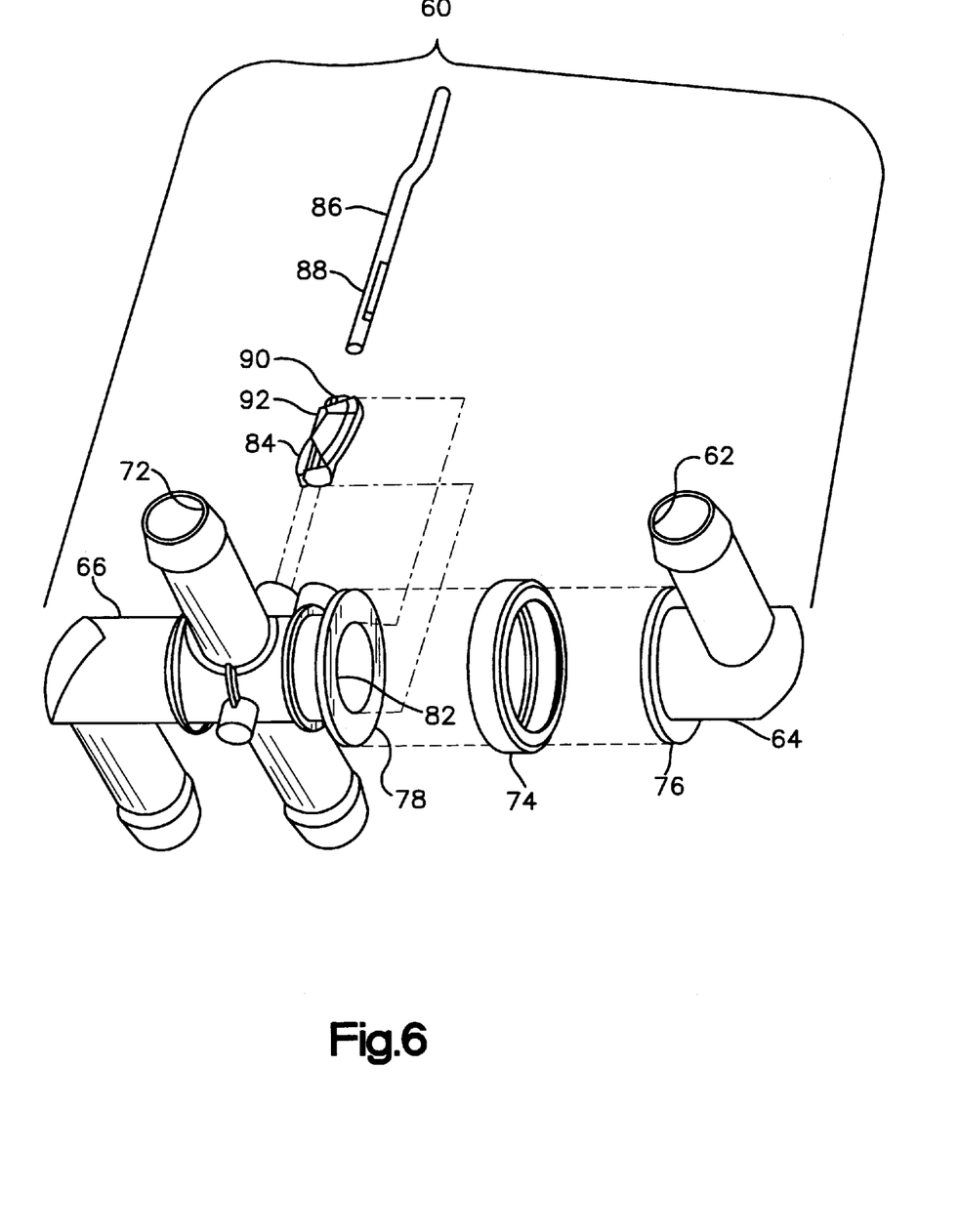
FIG. 6 is an exploded view of the valve of FIG. 4.

Referring to FIGS. 4, 5 and 6, another embodiment of the valve of the present invention is indicated generally at 60 and has a valve body construction identical to that of the embodiment 10 of FIG. 1 with a supply inlet passage 62 formed in an inlet body section 64. Valve assembly 60 includes an outlet body section 66 having an auxiliary outlet passage 68, an auxiliary inlet passage 70 and a supply return outlet passage 72 arranged and configured in the same manner as in the embodiment of FIG. 1. The body sections 64, 66 are attached by a clamp band 74 deformed over flanges 76, 78 provided respectively on the body section 64, 66; and, the interiors thereof are joined to form a valving chamber 83.

A baffle 80 is disposed in the valving chamber 83 formed within the body section 64, 66 and is configured and oriented identically to that of the baffle 44 in the embodiment of FIG. 1. It will be understood that baffle 80 functions in the same manner as baffle 44 of the FIG. 1 embodiment 10.

The valve 60 has a butterfly valve member 84 disposed in the valving chamber 82 by insertion in the end of member 66 before attachment to member 64; and, the butterfly is mounted on a shaft 86 which has at least one key 88 formed thereon for driving engagement through hub 90 of the valve member.

The butterfly valve member has formed thereon an additional baffle in the form of a thickened portion 92 which is disposed to enhance shutting off the return when the valve is approaching or is in the nearly fully "OPEN" position which, it will be understood, is shown in the solid line position shown in FIG. 5 for full flow to the auxiliary outlet passage 68.

It will be understood that the butterfly member is inserted in the valving passage 82 prior to attachment of the body section 66 to section 64; and, the shaft 86 is inserted through a bore in the side of body 66 for driving engagement of key 88 thereon with corresponding surfaces on the interior of the hub 90 of the butterfly member 84.

Figure 7:
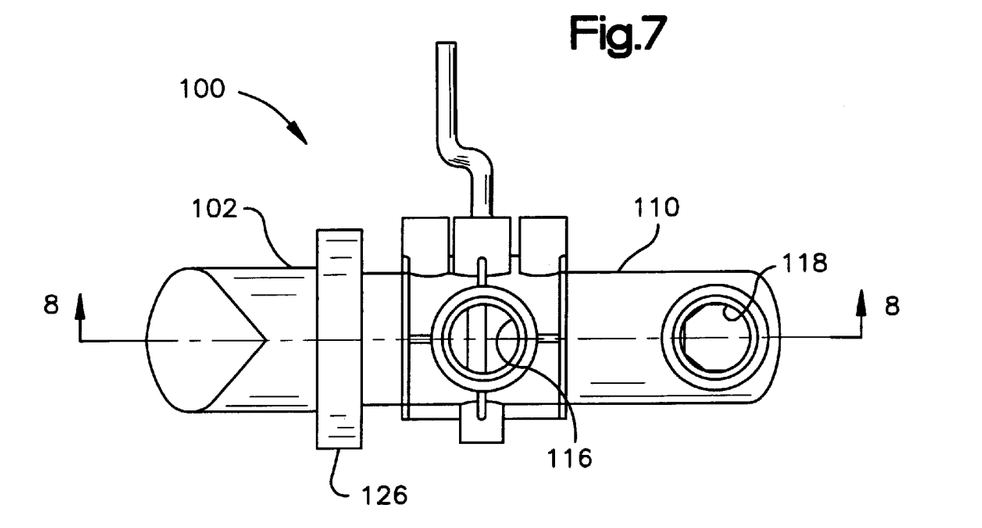
FIG. 7 is a view similar to FIG. 1 of another embodiment of the invention.
Figure 8:
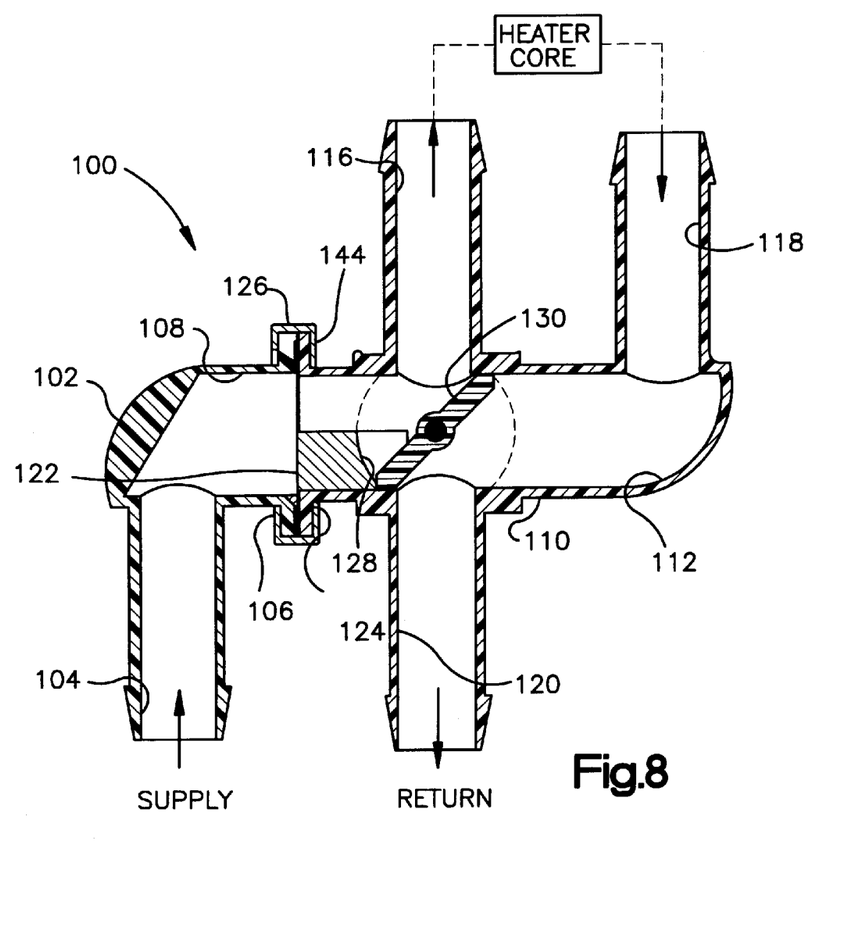
FIG. 8 is a section view taken along section-indicating liens 8—8 of FIG. 7.
Figure 9:
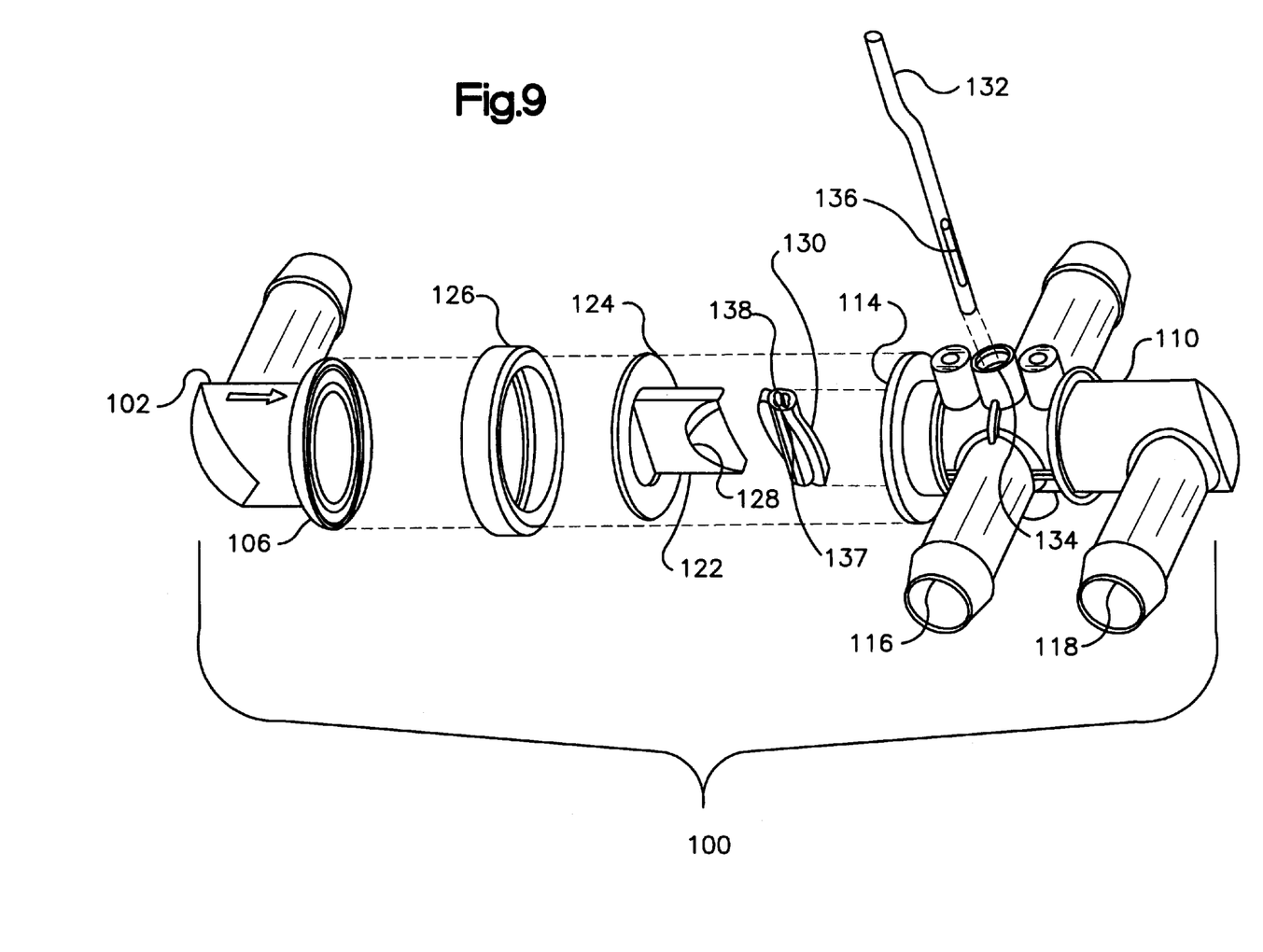
FIG. 9 is an exploded view of the valve of FIG. 7.

Referring to FIGS. 7 through 9, another embodiment of the invention is indicated generally at 100 and includes an inlet body section 102 having supply inlet passage 104 and an annular flange 106 formed about valving passage 108 formed interiorly thereof and which communicates with passage 104 and opens through an end flange 106. Valve 100 includes an outlet body section 110 having a valving passage 112 formed interiorly thereof which opens through a flange 114 formed thereabout and which is arranged oppositely disposed flange 106. Outlet body section 110 has an auxiliary outlet passage 116 adjacent and spaced from an auxiliary inlet passage 118, both of which communicate with valving passage 112; and, body member 112 has a return passage 120 disposed coincident with and oppositely directed from auxiliary outlet passage 116. Valving passage 108 in body section 102 and valving passage 112 in body section 110 are joined to form valving chamber 113.

Referring to FIGS. 8 and 9, the additional baffle is formed by a baffle insert member 122 which has a radially outwardly extending annular flange 124 formed thereon which is sized and configured to be sandwiched between flanges 106, 114 on the two body sections 102, 110 and retained therebetween by clamp band 126. The baffle 122 has an arcuately scalloped portion or recess 128 formed therein which provides a surface closely spaced from the periphery of the butterfly valve member 130 disposed in valving passage 112. The arrangement of the arcuate scalloped portion 128 is shown in FIG. 8 wherein the butterfly valve member 130 is shown in solid outline in the fully "OPEN" position wherein full flow is diverted to the auxiliary outlet passage 116. The insert 122 thus comprises a simple and relatively low-cost way of adding a baffle for enhancing shut off of flow to the return outlet 120 when the butterfly valve member is in the nearly full "OPEN" position. The baffle member 122 may thus be added to existing valve body structure at the time of joining body sections 102, 110 by clamping of band 126; and, thus the embodiment 100 does not require retooling of the existing body members 102, 110.

It will be understood with reference to FIG. 9, that the butterfly valve member is inserted into the valving chamber 112 prior to installation of the baffle 122 and clamp band 126; and, when the butterfly valve member 130 is inserted in valving chamber 112, actuator shaft 132 is inserted through bore 134 in the side of body 110 with key 136 formed on the shaft 132 engaging corresponding surfaces 137 formed in the hub 138 of the butterfly 130.

Figure 10:
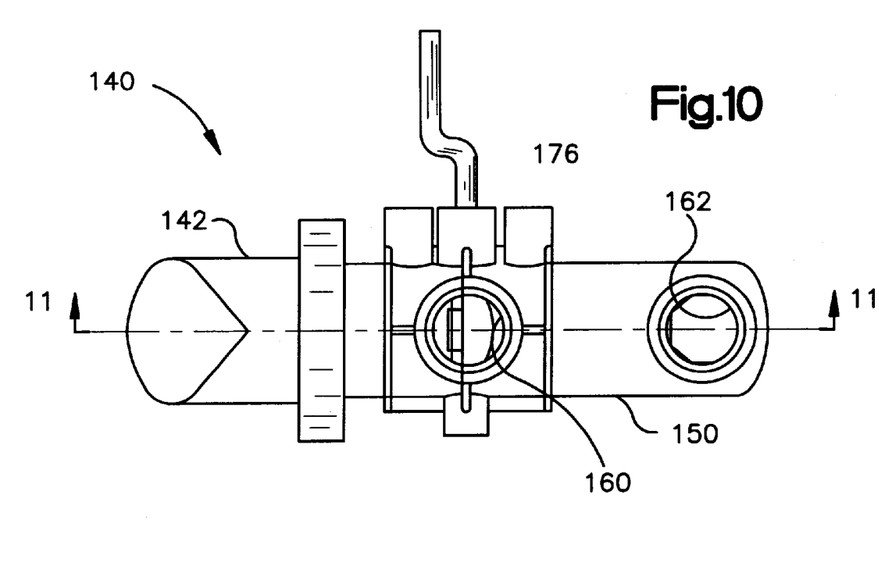
FIG. 10 is a view similar to FIG. 1 of another embodiment of the invention.
Figure 11:
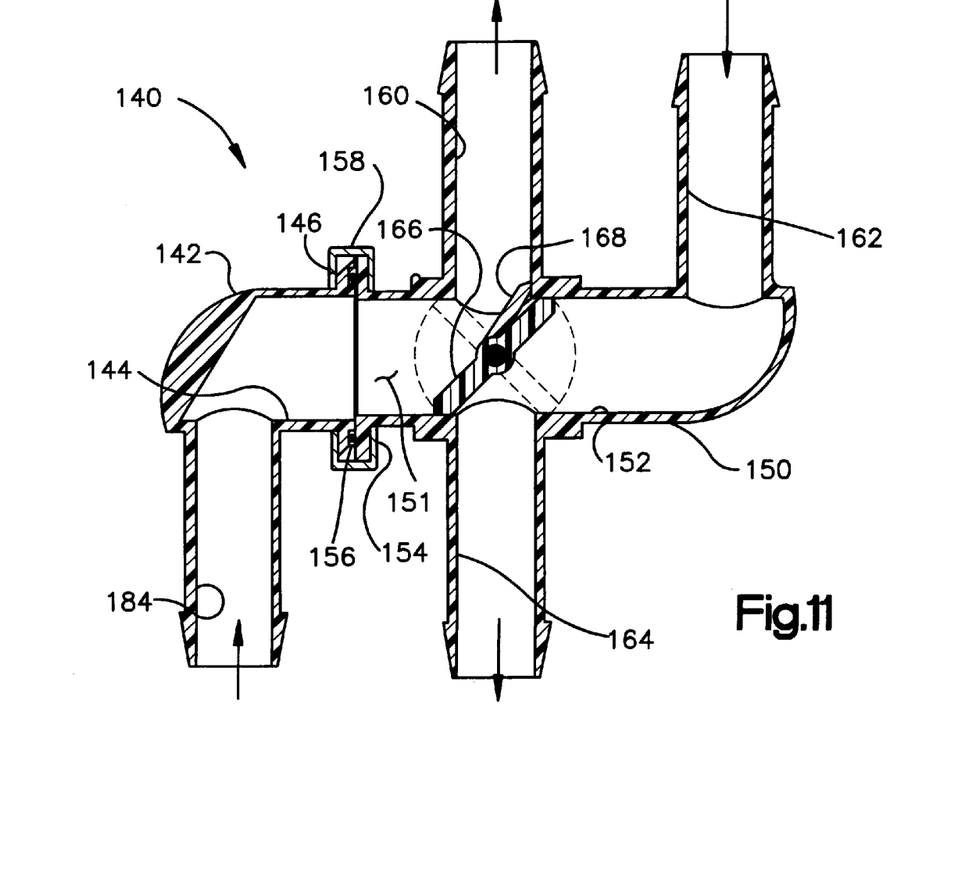
FIG. 11 is a section view taken along section-indicating lines 11—11 of FIG. 10.
Figure 12:
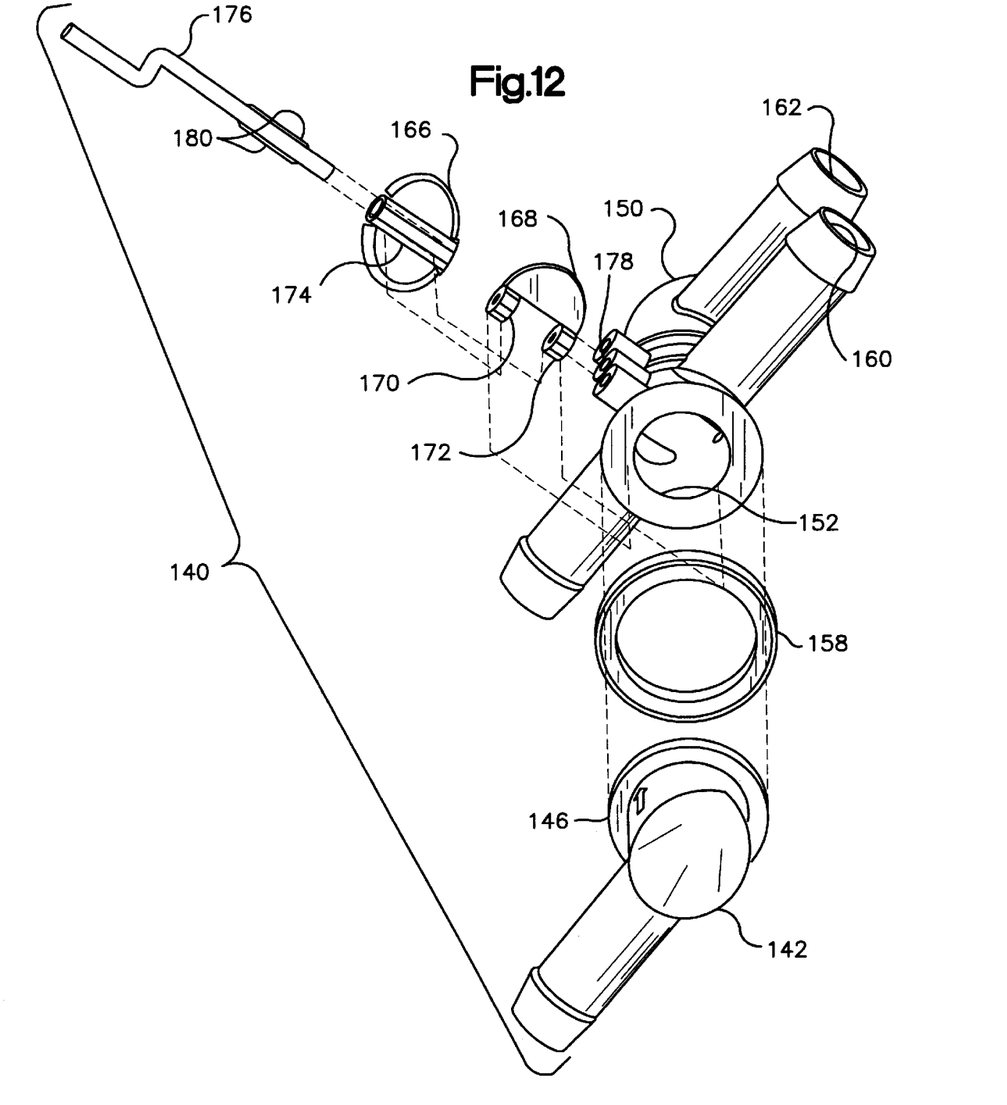
FIG. 12 is an exploded view of the valve of FIG. 10.

Referring to FIGS. 10 through 12, another embodiment of the invention is indicated generally at 140 and includes an inlet valve body member 142 having a valving passage 144 formed therein and opening through an annular flange 146 and having a supply passage 148 formed therein communicating with the valving passage 144. Valve 140 includes an outlet body section 150 having a valving passage 152 formed therein opens through an end thereof having an annular flange 154 provided thereabout which is abutted against flange 146 with a seal ring 156 received therebetween; and, the two flanges 146, 154 are retained together by a suitable annular clamp band 158. Valve body member 150 has an auxiliary outlet passage 160 spaced from a parallel auxiliary inlet passage 162, both of which communicate with the valving passage 152; and, body member 150 has a return passage 164 provided therein communicating with valving passage 152 and coinciding with passage 160 and oppositely directed therefrom. Passages 144 in body member 142 is thus joined with passage 152 in body member 150 and together form a valving chamber 151.

A butterfly valve member 166 is disposed in the valving chamber 151 by insertion in passage 152 prior to the clamping of the flanges 146, 154 by band 158. Butterfly member 166 has a coaxially mounted baffle member 168 or flapper received thereover which baffle has a pair of axially spaced hubs provided thereon as denoted by reference numerals 170, 172, which hubs straddle the central hub 174 of the butterfly 166. The baffle 168 and butterfly 166 are aligned in the valving passage 152 such that a shaft 176 received through side bore 178 passes through hub 174 of the butterfly valve 166 and hubs 170, 172 of the baffle 168 and secures them within the bore 152. It will be understood that the baffle 168 is free to rotate on shaft 176; whereas, shaft 176 has keys 180 provided thereon which drivingly engage the hub 174 of butterfly 166. Thus the baffle is free to rotate with respect to butterfly 166.

Referring to FIG. 11, the outer edge of baffle 168 is shown as engaging the wall of auxiliary outlet passage 180 and registered thereagainst such that rotation of the butterfly member 166 from the position shown in solid outline in FIG. 11 to the position shown in dashed outline does not effect movement of the baffle 168. The baffle is thus stationary and functions in a manner identical to that of the baffle member 44 of the embodiment of FIG. 1. The embodiment 140 thus provides the baffle function by a modification of the construction of the butterfly is assembled with and installed into the valve body outlet section 150 with the butterfly 166 and thus permits an existing valve body to be utilized without the necessity of retooling the valve body.

Figure 13:
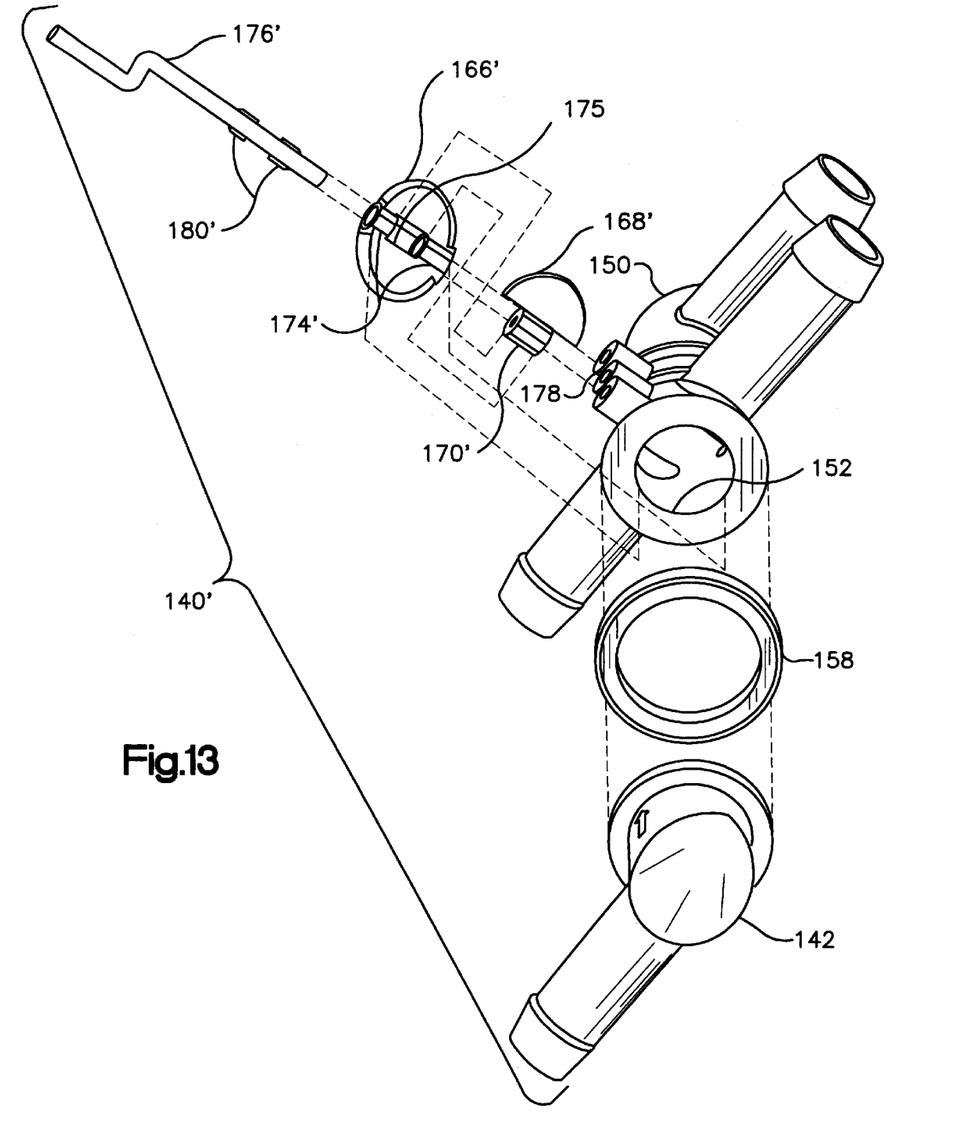
FIG. 13 is an exploded view of an alternative arrangement of the embodiment of FIG. 10.

Referring to FIG. 13, an alternate arrangement of the butterfly and baffle for the embodiment of FIG. 12 is illustrated wherein the butterfly 166' has a slot 175 formed in the hub 174'; and, the baffle 168' has the hub 170' thereof axially narrowed to fit within the slot 175. It will be understood that the shaft 176' has the keys 180' spaced axially therealong to engage the axially separate split hub portions 174' of the butterfly 166'. It will further be understood that the butterfly 166' and baffle 168' of the embodiment of FIG. 13 are assembled into the bore 152 of the outlet body section 150 in the same manner as in the embodiment of FIG. 12. It will be understood that in the embodiment of FIG. 13, the valve body sections and the clamp band arrangement are identical to the embodiment of FIG. 12; and, accordingly like reference numerals are used for corresponding parts in the embodiment of FIG. 13. The butterfly and baffle of FIG. 13 may be made by merely changing the shaft and butterfly in an existing valve body arrangement and thus requires no retooling for an existing valve design.

Figure 14:
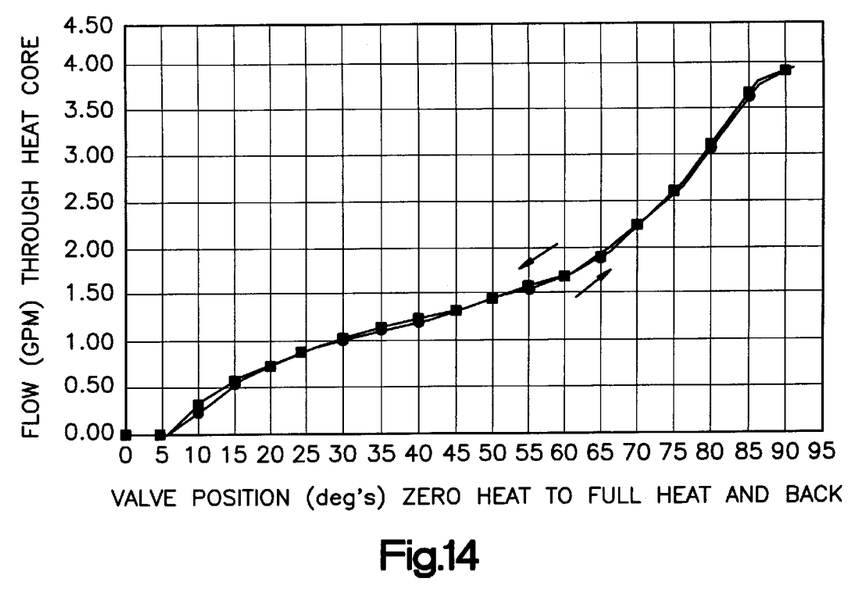
FIG. 14 is a graphical plot of flow to the auxiliary outlet and return to the auxiliary inlet as a function of the rotary position of the butterfly valve; and, FIG. 15 is a graphical plot similar to FIG. 14 for valves of the prior art.

Referring to FIG. 14, a typical graph of values of flow through the auxiliary outlet as a function of butterfly valve rotary position moving from a position fully closed for the auxiliary outlet to a position fully opening the auxiliary outlet and return are plotted. It will be seen from FIG. 14 that the valve of the present invention provides substantially linear relationship between the flow through the auxiliary outlet and the rotary position of the butterfly valve throughout the full operating range of the butterfly valve movement. The valve of the present invention thus provides a substantial improvement over the flow characteristics of the valve without the present invention as shown in FIG. 15 wherein flow through the auxiliary outlet is delayed until a substantial amount of rotation of the butterfly has occurred.

Although the invention has hereinabove been described with respect to the illustrated embodiments, it will be understood that the invention is capable of modification and variation and is limited only by the following claims.

What is claimed is:

1. A butterfly flow diverter valve assembly comprising:
    (a) a valve body having a supply inlet, a return outlet, an auxiliary outlet and an auxiliary return inlet, communicating with a valving passage;
    (b) a butterfly valve member disposed in said valving passage in said body and moveable between (i) a first position diverting all flow from said supply inlet to said auxiliary outlet to (ii) a plurality of second positions diverting a portion of flow from said supply inlet to said auxiliary outlet and diverting the balance of the flow from said supply inlet to said return outlet; and (iii) a third position diverting all flow from said supply inlet to said return outlet;
    (c) baffle structure disposed to remain stationary and operable, when said butterfly valve member is in one of said second positions, to baffle flow of said diverted portion in the region of said auxiliary outlet and to thereby facilitate diverting flow to said auxiliary outlet.

2. The valve assembly defined in claim 1, wherein said baffle structure includes a stationary vane extending from the intersection of said valving passage and said auxiliary outlet.

3. The valve assembly defined in claim 1, wherein said baffle structure includes an auxiliary vane extending from said butterfly member.

4. The valve assembly defined in claim 1, wherein said baffle structure includes a tubular insert in said auxiliary outlet, said insert having a vane formed on an end thereof and extending into said valving passage.

5. The valve assembly defined in claim 1, wherein said baffle structure comprises a vane disposed for movement with said butterfly member and extending obliquely therefrom.

6. The valve assembly defined in claim 1, wherein said baffle structure includes a vane extending from said butterfly member obliquely at about 60° relative thereto.

7. The valve assembly defined in claim 1, wherein said baffle structure includes a vane member mounted on a common shaft with said butterfly member for movement with said butterfly member.

8. The valve assembly defined in claim 1, wherein said auxiliary outlet and said return outlet are aligned and directed in opposite directions.

9. The valve assembly defined in claim 1, wherein said butterfly member is mounted on a shaft which pivots and said inlets and outlets extend at about right angles to said shaft.

10. A method of operating a butterfly diverter valve assembly comprising:
    (a) forming a supply inlet, a return outlet, an auxiliary outlet and an auxiliary return inlet in a valve body and communicating such inlets and outlets with a valving passage in the body;
    (b) disposing a butterfly valve member in said valving passage and rotating said butterfly valve member between a closed position diverting all flow from said supply inlet to said return outlet and a plurality of intermediate positions diverting a portion of supply inlet flow to said auxiliary outlet and a full open position diverting all supply inlet flow to said auxiliary outlet; and, (c) disposing a stationary baffle adjacent said butterfly and baffling said flow in said plurality of intermediate and fully open positions and facilitating flow to said auxiliary outlet when said butterfly valve member diverts only a small portion of supply inlet flow to said auxiliary outlet.

11. The method defined in claim 10, wherein said step of baffling includes disposing a vane on a shaft obliquely with respect to said butterfly valve member and moving said butterfly valve member with respect to said vane.

12. The method defined in claim 10, wherein said step of baffling includes disposing a vane at the intersection of said auxiliary outlet and said valving passage and extending said vane into said valving passage.

13. A method of controlling flow of engine coolant to a passenger compartment heat exchanger comprising:

(a) forming a valving passage in a valve body and disposing a butterfly valve member in the valving passage;

(b) connecting a supply port in the valving passage to a source of heated engine coolant;

(c) connecting a return port in the valving passage to the engine coolant return;

(d) connecting an auxiliary outlet port in the valving passage to the heat exchanger inlet and connecting an auxiliary inlet port in the valving passage to the heat exchanger outlet;

(e) rotating the butterfly valve member between a closed position directing all flow from the supply port to the engine coolant return and a plurality of open positions diverting a portion of supply port flow to said heat exchanger inlet and a fully open position directing all supply port flow to said heat exchanger inlet; and, (f) baffling said flow in the region of said auxiliary outlet port when said butterfly is in any of said open and fully open positions and facilitating said diverting when said portion is only a minor fraction of supply flow.

14. The method defined in claim 13, wherein said step of baffling includes disposing an oblique vane on said butterfly member and rotating said butterfly member with respect to said vane.

15. The method defined in claim 13, wherein said step of baffling includes disposing a stationary vane in said valving passage and extending said vane from the region of the intersection of said auxiliary return port and said valving passage.

* * * * *